US009559963B2

(12) United States Patent
Mikoda et al.

(10) Patent No.: US 9,559,963 B2
(45) Date of Patent: Jan. 31, 2017

(54) COMMUNICATION SYSTEM AND AUTOMATIC METERING SYSTEM

(75) Inventors: Tsuyoshi Mikoda, Tokyo (JP); Hitoshi Kubota, Tokyo (JP); Toshihiro Inoue, Tokyo (JP); Mitsunobu Abe, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 214 days.

(21) Appl. No.: 14/364,684

(22) PCT Filed: Dec. 20, 2011

(86) PCT No.: PCT/JP2011/079508
§ 371 (c)(1),
(2), (4) Date: Jun. 12, 2014

(87) PCT Pub. No.: WO2013/094013
PCT Pub. Date: Jun. 27, 2013

(65) Prior Publication Data
US 2014/0376377 A1 Dec. 25, 2014

(51) Int. Cl.
*H04W 4/00* (2009.01)
*H04L 12/803* (2013.01)
(Continued)

(52) U.S. Cl.
CPC .............. *H04L 47/125* (2013.01); *H04L 49/15* (2013.01); *H04Q 9/00* (2013.01); *H04W 24/02* (2013.01);
(Continued)

(58) Field of Classification Search
CPC ........ H04L 47/125; H04L 49/15; H04L 47/14; H04L 43/0817; H04Q 9/00; H04Q 2209/60; H04W 24/02; H04W 40/12; H04W 84/22
See application file for complete search history.

(56) References Cited

U.S. PATENT DOCUMENTS 6,865,185 B1 * 3/2005 Patel .................. H04L 47/12
370/310
7,042,988 B2 * 5/2006 Juitt .................... H04L 1/22
370/329
(Continued)

FOREIGN PATENT DOCUMENTS

JP 2005-79827 A 3/2005
JP 2007-129380 A 5/2007
(Continued)

OTHER PUBLICATIONS

International Search Report (Form PCT/ISA/210) and Written Opinion (Form PCT/ISA/237) issued on Mar. 27, 2012, by Japanese Patent Office as the International Searching Authority for international Application No. PCT/JP2011/079508. (9 pages).
(Continued)

*Primary Examiner* — Phuc Tran
(74) *Attorney, Agent, or Firm* — Buchanan Ingersoll & Rooney PC

(57) ABSTRACT

A communication system according to the present invention includes a plurality of ad hoc communication networks each formed by one or more communication units and one gateway and includes a monitoring server that monitors the ad hoc communication networks. The monitoring server determines on the basis of a monitoring result of load states of the gateways and a monitoring result of a congestion state of radio traffic whether it is necessary to carry out load distribution control for moving a communication unit subordinate to a first gateway to be subordinate to a second gateway set around the first gateway and, when determining that it is necessary to carry out the load distribution control,
(Continued)

instructs at least one gateway of the first gateway and the second gateway to broadcast-deliver a signal including control information and instructing reselection of a gateway set as a participation destination.

10 Claims, 10 Drawing Sheets

(51) Int. Cl.
    *H04W 24/02*     (2009.01)
    *H04L 12/933*     (2013.01)
    *H04Q 9/00*     (2006.01)
    *H04L 12/26*     (2006.01)
    *H04W 84/22*     (2009.01)
    *H04W 40/12*     (2009.01)
    *H04L 12/801*     (2013.01)

(52) U.S. Cl.
    CPC ............ *H04L 43/0817* (2013.01); *H04L 47/14* (2013.01); *H04Q 2209/60* (2013.01); *H04W 40/12* (2013.01); *H04W 84/22* (2013.01)

(56) References Cited

U.S. PATENT DOCUMENTS

| | | | |
|---|---|---|---|
| 7,209,968 B1 * | 4/2007 | Secer | H04L 41/0213 707/999.01 |
| 7,647,422 B2 * | 1/2010 | Singh | H04L 12/4641 370/351 |
| 7,760,745 B2 * | 7/2010 | Qureshi | H04L 45/04 370/315 |
| 8,559,447 B2 * | 10/2013 | Jetcheva | H04L 45/124 370/401 |
| 8,761,008 B2 * | 6/2014 | Meier | H04L 12/66 370/229 |
| 2003/0088698 A1 * | 5/2003 | Singh | H04L 12/4641 709/239 |
| 2005/0271051 A1 * | 12/2005 | Holloway | H04L 12/5695 370/389 |
| 2007/0097906 A1 | 5/2007 | Kato | |

FOREIGN PATENT DOCUMENTS

| | | |
|---|---|---|
| JP | 2008-193318 A | 8/2008 |
| JP | 2009-81854 A | 4/2009 |
| JP | 2010-219801 A | 9/2010 |

OTHER PUBLICATIONS

Ono et al. "Development of a PHS Automatic Metering System", OMRON Technics vol. 41 No. 1 (137th issue) 2001. (pp. 50-56).

Perkins, "Ad hoc On-Demand Distance Vector (AODV) Routing", Network Working Group, Nokia Research Center, Jul. 2003. (33 pages).

Winter, et al., "RPL: IPv6 Routing Protocol for Low power and Lossy Networks", draft-ietf-roll-rpl-19, Mar. 13, 2011. (145 pages).

* cited by examiner

FIG.5

| No | GW INFORMATION ||||||| PARTICIPA-TION STATE | LAST UPDATE TIME |
|---|---|---|---|---|---|---|---|---|---|
| | GW ID | RADIO CH | NUMBER OF HOPS | HOUSED NUMBER | ROUTE QUALITY | OPTION | | |
| 1 | 2A | X | 2 | 900 | A | - | ○ | 20xx/01/02 XX:XX:AA |
| 2 | 2B | X | 2 | 500 | B | - | | 20xx/01/02 XX:YY:BB |
| 3 | ... | ... | ... | ... | ... | | | 20xx/01/02 XX:ZZ:CC |
| 4 | ... | ... | ... | ... | ... | | | 20xx/01/02 XX:ZZ:DD |

COMMUNICATION SYSTEM AND AUTOMATIC METERING SYSTEM

FIELD

The present invention relates to a communication system used for building a system, which automatically meters consumption amounts of electricity, water service, gas, and the like, and an automatic metering system.

BACKGROUND

In recent years, a form for applying, as a network infrastructure for various kinds of automatic metering for electricity, water service, and gas, ad hoc communication in which a plurality of communication units communicate with one another by radio and multi-hop to form a wide area network has been examined. By using the ad hoc communication, it is possible to realize an automatic metering system that covers a wide range area while suppressing facility costs (see Non Patent Literature 1)

In route establishment in the ad hoc communication, a network is built by exchanging route information among radio communication terminals (the communication units). A plurality of systems for means for exchanging the route information and the route establishment (a routing protocol) are examined and standardized by an IETF (Internet Engineering Task Force) (see Non Patent Literatures 2 and 3).

In the automatic metering system, a job application for performing collecting of meter reading data and monitoring and control of the network is operated through the ad hoc communication network infrastructure. However, it is unrealistic from the viewpoints of the number of multi-hops and collection traffic to provide the network infrastructure from the communication unit to a job server (a server that collects meter reading data) in a data center through the ad hoc communication of the same radio media. Therefore, a system model is assumed in which distributedly-arranged gateways, which relay the ad hoc communication network and an existing IP network, perform communication medium conversion and protocol conversion to thereby enable communication between the job server and the communication units.

CITATION LIST

Non Patent Literature

Non Patent Literature 1: "Development of a PHS Automatic Metering System", OMRON TECHNICS Vol. 41 No. 1 (137th issue) 2001
Non Patent Literature 2: "Ad hoc On-Demand Distance Vector (AODV) Routing" IETF RFC3561
Non Patent Literature 3: "RPL: IPv6 Routing Protocol for Low power and Lossy Networks", IETF draft-ietf-roll-rpl-19.txt

SUMMARY

Technical Problem

When the ad hoc communication is applied as the network infrastructure of the various kinds of automatic metering, a gateway functions as a base point and carries out collection of meter reading data and network monitoring and control targeting all communication units subordinate to the gateway. Therefore, according to an increase in the number of communication units participating in the gateway, it is likely that communication performance is deteriorated because of the influence of an increase in a processing load in the gateway, occurrence of radio interference (radio traffic congestion) around the gateway, and the like. Therefore, when a state of the deterioration in the communication performance due to the increase in the processing load and the radio traffic congestion in the gateway occurs in the ad hoc communication network, it is necessary to carry out treatment explained below to eliminate the deterioration in the communication performance. For example, a gateway is set anew around an area where a gateway in a high load state is set. A part of communication units subordinate to the gateway in the high load state are moved to be subordinate to the other gateway set anew. Alternatively, if another gateway in a low load state is present around the gateway in the high load state, a part of the communication units subordinate to the gateway in the high load state are moved to be subordinate to the other gateway.

As means for moving the communication units subordinate to the gateway in the high load state to be subordinate to the other gateway, it is conceivable that a server that monitors the gateways or the network (a monitoring server) urges the communication units subordinate to the gateway in the high load state to switch the gateway (reselect a gateway set as a participation destination) through an individual instruction or a simultaneous instruction. However, there is a problem in that, depending on a positional relation between the gateway in the high load state and the other gateway around the gateway in the high load state, it is difficult to instruct the communication units to switch the gateway to distribute loads. Further, it is likely that information collection traffic necessary for control adversely affects job communication (communication for collecting meter reading data) and the communication performance is further deteriorated.

For example, when the existing gateway and the gateway set anew are close to each other, even if the new gateway is set and the communication units are instructed to switch the gateway through the simultaneous instruction, it is likely that the loads are not distributed (the numbers of communication units respectively participating in the gateways are not leveled). On the other hand, when the individual instruction is performed, the gateway or the monitoring server can grasp states of the communication units, determine the communication units that the gateway or the monitoring server causes to switch a participation destination, and surely perform the load distribution. However, traffic for collecting information concerning the states of the communication units increases and adversely affects the job communication. In addition, the gateway or the monitoring server needs to individually issue instructions to the communication units that the gateway or the monitoring server causes to switch the participation destination. Consequently, the traffic also increases and adversely affects the job communication.

The present invention has been devised in view of the above and it is an object of the present invention to obtain a communication system capable of leveling, even in a state in which a plurality of gateways are close to one another, the numbers of communication units participating in the gateways while suppressing an influence on job communication.

Solution to Problem

To solve the above problem and attain the object, the present invention includes: a plurality of ad hoc communication networks each formed by one or more communication units and one gateway; and a monitoring server that monitors the ad hoc communication networks, wherein the monitoring server determines, on the basis of a monitoring result of load states of the gateways and a monitoring result of a congestion state of radio traffic, whether it is necessary to carry out load distribution control for moving a communication unit subordinate to a predetermined first gateway to be subordinate to a second gateway set around the first gateway and, when determining that it is necessary to carry out the load distribution control, instructs at least one gateway of the first gateway and the second gateway to broadcast-deliver a signal including control information that indicates a condition of a communication unit set as a movement target and instructing reselection of a gateway set as a participation destination.

Advantageous Effects of Invention

According to the present invention, there is an effect that, even in a special environment in which it is likely that the numbers of communication units participating in the gateways are not leveled if a participation destination is selected by the conventional method, for example, when a plurality of gateways are close to one another, it is possible to surely level the numbers of the communication units participating in the gateways and distribute loads of the gateways. Further, it is possible to distribute the loads while suppressing the influence on job communication.

BRIEF DESCRIPTION OF DRAWINGS

FIG. 5 is a diagram of an example of information managed by a gateway-information retaining section.

DESCRIPTION OF EMBODIMENTS

Embodiments of a communication system and an automatic metering system according to the present invention are explained in detail below with reference to the drawings. Note that the present invention is not limited by the embodiments.

First Embodiment

Figure 1:
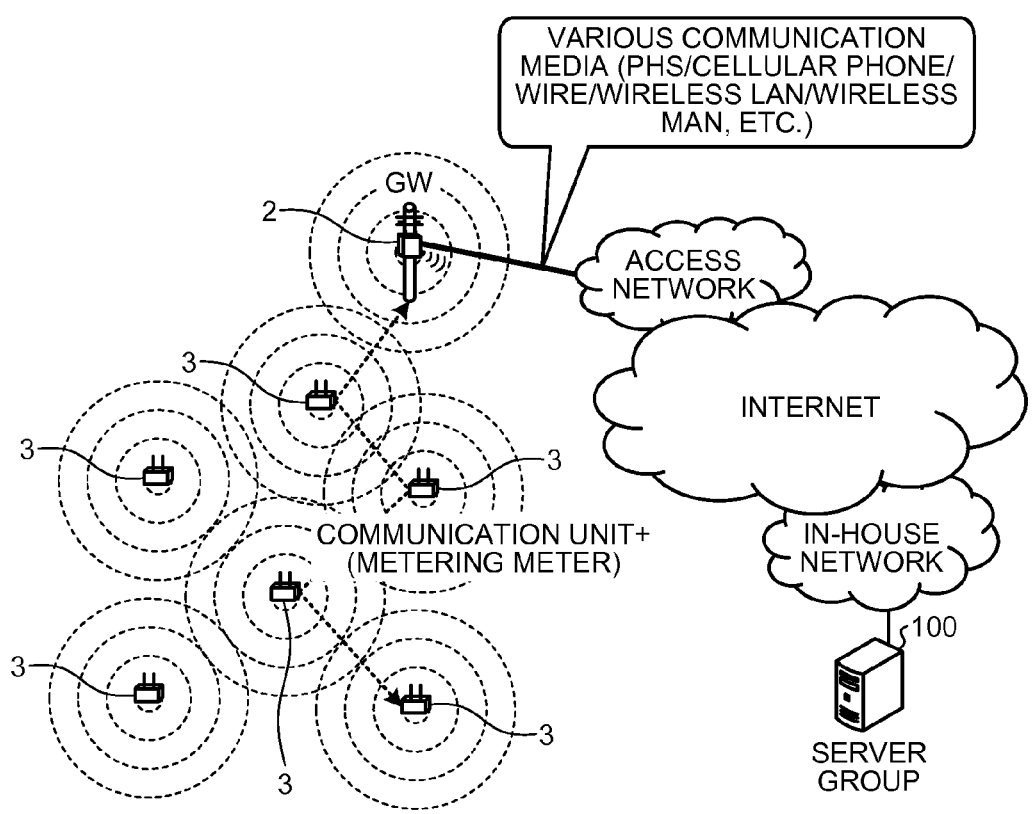
FIG. 1 is a diagram of a configuration example of a first embodiment of an automatic metering system applied with a communication system according to the present invention.

FIG. 1 is a diagram of a configuration example of a first embodiment of an automatic metering system applied with a communication system according to the present invention. As shown in FIG. 1, the communication system in this embodiment includes a gateway (GW) 2, a plurality of communication units 3, and a server group 100 including a job server that collects meter reading data via the communication units 3 and a monitoring server that monitors a network. The gateway 2 and the server group 100 are connected via networks such as an access network, the internet, an in-house network. Note that the gateway and the network (the access network) are connected by a communication medium such as a PHS (Personal Handyphone system), a cellular phone, a wire, a wireless LAN (Local Area Network), or a radio MAN (Metropolitan Area Network). The communication units 3 form an ad hoc communication network. A measuring meter not shown in the figure is connected to the communication units 3. The measuring meter measures consumption amounts of electricity, gas, water service, and the like required by the job server. Note that the communication units 3 can include a measuring meter function. The communication units 3 acquire a measurement result by the measuring meter at predetermined timing and transmit the acquired measurement result to the job server as meter reading data. In FIG. 1, for simplification, one gateway 2 is shown. However, actually, a plurality of the gateways 2 are connected to the server group 100. The communication units 3 participate in the gateways.

Figure 2:
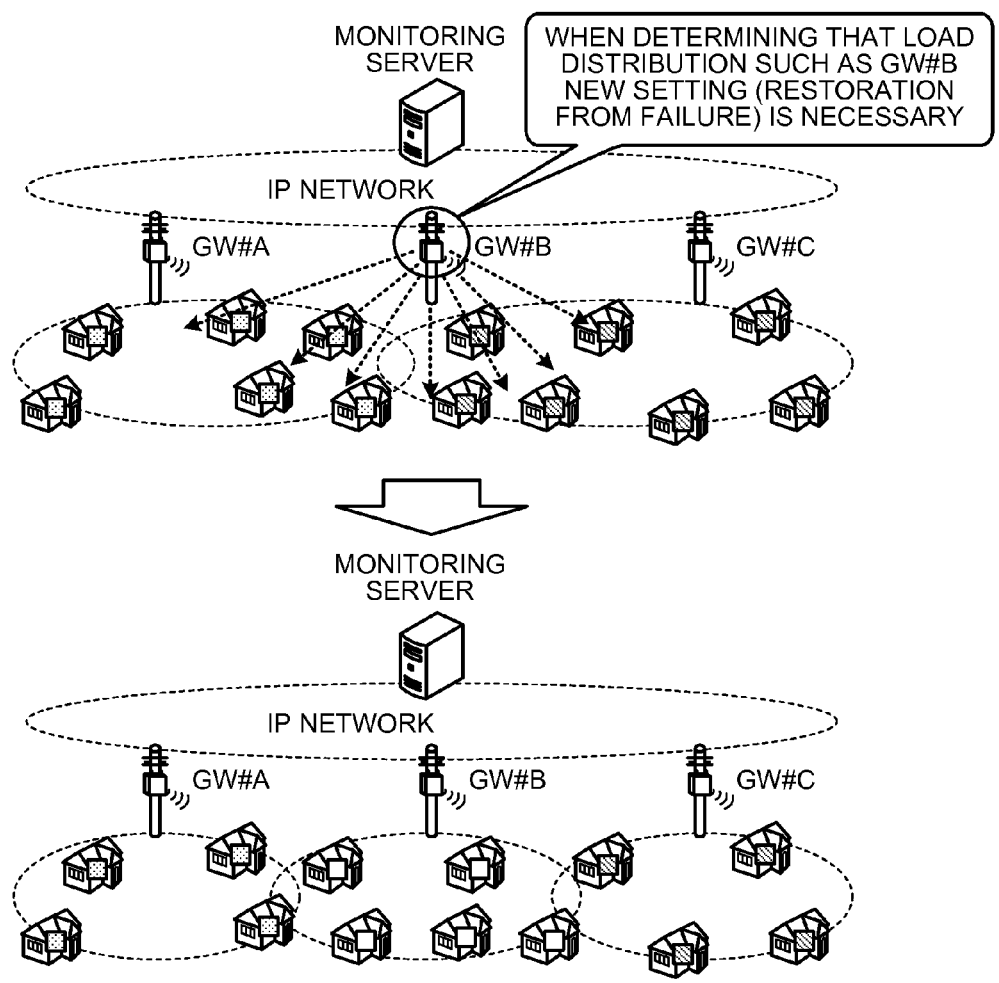
FIG. 2 is a schematic diagram of an operation for leveling the numbers of communication units participating in respective gateways.

FIG. 2 is a schematic diagram of an operation for leveling the numbers of communication units respectively participating in a plurality of gateways in the communication system applied to the automatic metering system (a load distributing operation). FIG. 2 shows an operation performed when, in a state in which a gateway (GW#A) in which six communication units already participate and a gateway (GW#C) in which seven communication units already participate are present, a GW#B is set anew between the GW#A and the GW#C (or the GW#B is restored from a failure).

As shown in FIG. 2, when the GW#B set anew (or restored from a failure) starts an operation, the GW#B delivers information concerning the GW#B itself and instructs communication units around the GW#B to reselect a gateway at a participation destination. The communication units, which receive the instruction, determine on the basis of the delivered information concerning GW#B and information delivered in the past from the gateways other than GW#B (information concerning the GW#A and the GW#C) whether it is necessary to switch the gateway at the participation destination. When determining that it is necessary to switch the gateway at the participation destination, the communication units switch the gateway at the participation destination to the GW#B (re-participates in the GW#B). As a result, a part of communication units subordinate to the GW#A and a part of communication units subordinate to the GW#C switch the participation destination to the GW#B. Processing loads of the gateways are distributed. At this point, control information (the information concerning the GW#B and the reselection instruction for the participation destination) transmitted from the monitoring server side to the communication units is broadcast-delivered. The monitoring server determines on the basis of state monitoring results of ad hoc communication networks whether it is necessary to execute the operation for distributing the loads of the gateways.

<Basic Control Operation on which the Communication System According to the Present Invention is Based>

Figure 3:
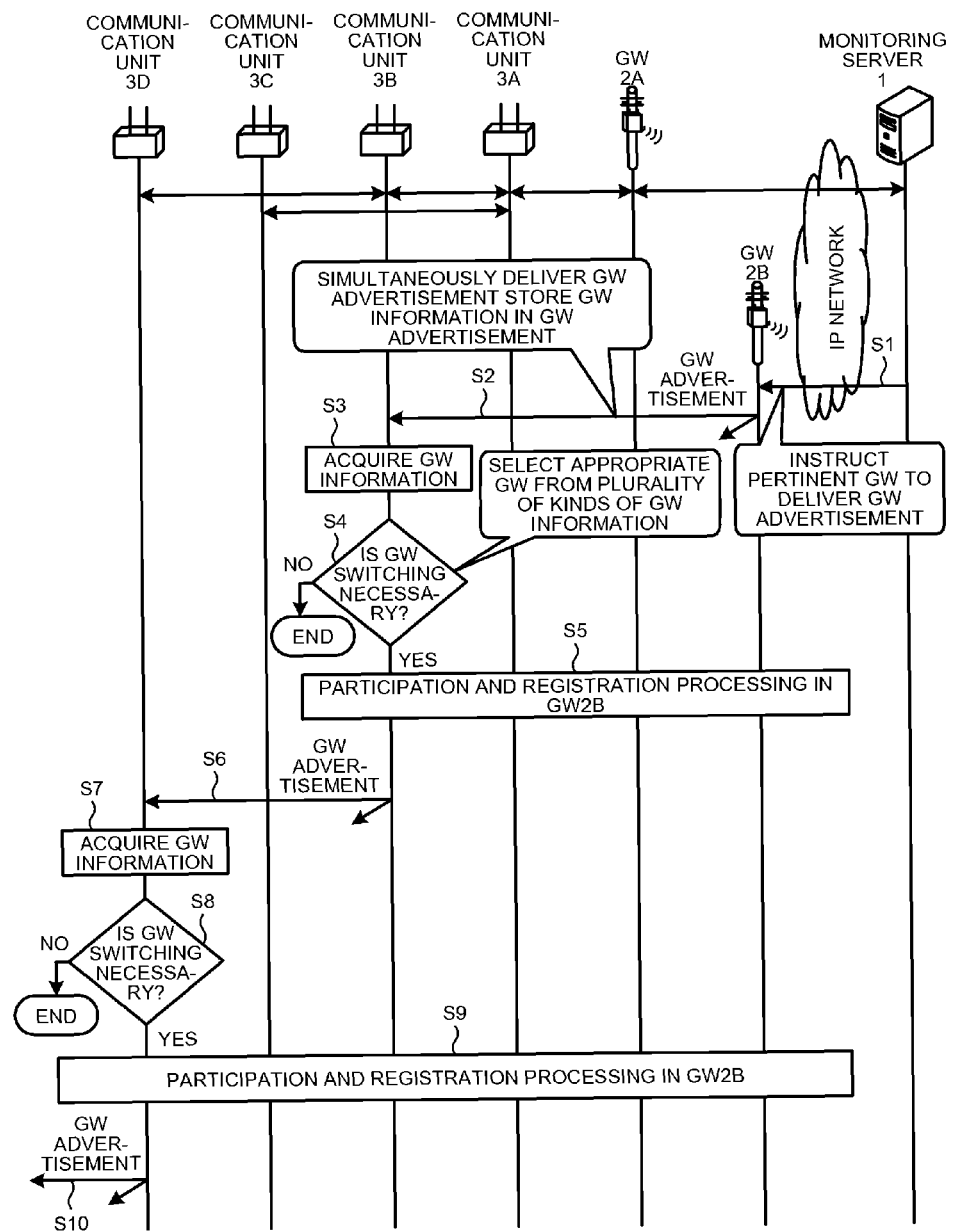
FIG. 3 is a diagram of a basic control operation on which the communication system according to the present invention is based.

Before a characteristic operation in this embodiment is explained, a basic control operation carried out in the communication system according to the present invention is explained with reference to FIG. 3. FIG. 3 is a diagram of the basic control operation on which the communication system according to the present invention is based. FIG. 3 shows an example of an operation for determining whether a gateway at a participation destination is switched when a communication unit already participating in a certain gateway receives control information broadcast-delivered from another gateway (a gateway different from the participating gateway) and an operation carried out when it is determined that the participation destination is switched.

First, the configuration of the communication system assumed in the basic control operation shown in FIG. 3 is explained. The communication system includes, in an initial state, a monitoring server 1, a gateway (GW) 2A connected to the monitoring server 1 via an IP network or the like, and communication units 3A, 3B, 3C, and 3D. The communication units 3A to 3D form an ad hoc communication network in which the gateway 2A is set as a base point. Specifically, the communication units 3A to 3D are housed (registered to participate) in the gateway 2A and capable of communicating with a server group including the monitoring server 1 through the gateway 2A. The gateway 2A directly communicates with the communication unit 3A. The communication unit 3A directly communicates with the communication units 3B and 3C present downstream. The communication unit 3B directly communicates with the communication unit 3D present downstream. Note that, in the initial state, only the gateway 2A is set and a gateway 2B is not set and a gateway in which the communication units 3A to 3D can participate is only the gateway 2A. Note that the configuration of the communication system is not limited to the configuration shown in FIG. 3. The number of gateways and the number of communication units and a connection relation between the gateways and the communication units can be different from the numbers and the connection relation shown in FIG. 3.

The basic control operation shown in FIG. 3 is explained. The monitoring server 1 monitors apparatus states and communication states of the gateways and the communication units. Specifically, the monitoring server 1 monitors the numbers of communication units housed in the gateways 2A connected to the monitoring server 1 (a processing load state), a radio traffic congestion (radio interference) state in an ad hoc communication network formed by the communication units subordinate to the gateway 2A, and the like. The monitoring server 1 periodically collects these kinds of information (information such as the number of units housed in the gateway, hereinafter referred to as monitoring information) from the gateway 2A. When the monitoring server 1 acquires the monitoring information, the monitoring server 1 determines whether it is necessary to change a participation destination gateway of the communication units. For example, when the number of communication units housed in the gateway 2A reaches a predetermined number, when a processing load of the gateway 2A is in a high state, and when radio traffic congestion occurs in the ad hoc communication network formed by the communication units subordinate to the gateway 2A, the monitoring server 1 determines that job communication is hindered. The monitoring server 1 determines that the participation destination gateway of the communication units is changed (a part of the communication units subordinate to the gateway 2A are moved to be subordinate to another gateway).

In this explanation, the explanation is continued assuming that the monitoring server 1 determines that the job communication is hindered. When the monitoring server 1 determines that the job communication is hindered, for example, the monitoring server 1 notifies an administrator of the system to that effect. The administrator takes measures for setting the gateway 2B anew in the same area (near the gateway 2A). Note that an operation performed when the gateway 2B fails and, after a communication unit participating in the gateway 2B changes a participation destination to the gateway 2A, the gateway 2B is restored is the same as an operation performed when the gateway 2B is set anew. An operation performed when, in a state in which the gateways 2A and 2B are performing a normal operation, the numbers of communication units participating in the gateways change to an imbalanced state (a state in which the number of communication units subordinate to one gateway is excessively larger than the number of the other) because of some cause and the monitoring server determines that load distribution is necessary is the same as the operation performed when the gateway 2B is set anew. The gateways 2A and 2B perform communication with the communication units using the same frequency band.

When it is necessary to move the communication units subordinate to the existing gateway 2A to be subordinate to the gateway 2B near the gateway 2A because, for example, the gateway 2B is set anew near the gateway 2A, the monitoring server 1 instructs the gateway 2B, which is a moving destination (a re-participation destination), to deliver a gateway advertisement message (hereinafter referred to as gateway advertisement or GW advertisement) (step S1). Note that, in FIG. 3, the monitoring server 1 explicitly gives an instruction to the gateway 2B. However, the gateway 2B can autonomously deliver the gateway advertisement after apparatus startup according to a prior instruction (prior setting) to the gateway 2B. The gateway advertisement is a message for notifying an apparatus state of a gateway itself at a transmission source. The message is broadcast-delivered to notify communication units around the gateway of gateway information. The gateway information includes identification information of the transmission source gateway and information necessary during selection of a participation destination gateway (e.g., the number of hops to the transmission source gateway, the number of communication units housed in the transmission source gateway, and communication quality in a route to the transmission source gateway).

The gateway 2B, which is instructed by the monitoring server 1 to deliver the gateway advertisement, broadcast-delivers the gateway advertisement including the gateway information (step S2). A communication unit (in the example shown in FIG. 2, the communication unit 3B), which receives the gateway advertisement, acquires the gateway information (gateway information of the gateway 2B) included in the gateway advertisement (step S3) and determines whether switching of the gateway is necessary (step S4). At step S4, the communication unit 3B determines on the basis of the gateway information acquired at step S3 and gateway information retained to that point (gateway information of the gateway 2A) whether it is necessary to switch a participation destination to the gateway 2B. For example, when the number of hops to the gateway 2B is smaller than the number of hops to the participating gateway 2A, the communication unit 3B determines that it is necessary to switch the participation destination. When it is necessary to switch the participation destination (Yes at step S4), the communication unit 3B secedes from a GW2A and performs processing for participation and registration in a GW2B (step S5). When the participation and registration processing ends, the communication unit 3B broadcast-transfers the GW advertisement to a communication unit present downstream (step S6). When it is unnecessary to switch the participation destination (No at step S4), the communication unit 3B ends the processing. Note that the seceding processing from the GW2A and the participation and registration processing in the GW2B are general processing carried out from the past. Therefore, detailed explanation of the processing is omitted. At step S6, the communication unit 3B transmits the GW advertisement received at step S2 after updating the gateway information included in the GW advertisement rather than directly transferring the GW advertisement received at step S2. Specifically, the communication unit 3B increments the number of hops to the transmission source gateway and updates the communication quality to the transmission source gateway on the basis of gateway advertisement reception quality (reception radio wave intensity) at step S2.

However, when a gateway advertisement same as a gateway advertisement received in the past is received at step S2, the communication unit 3B does not carry out the processing at step S3 and subsequent steps. The communication unit 3B determines, by checking a sequence number given by a gateway that delivers the gateway advertisement (a fixed value not changed by the communication unit during transfer), whether the gateway advertisement is the gateway advertisement received in the past.

Note that Non Patent Literature 3 describes that a gateway (a route apparatus of a tree topology) broadcast-delivers a DIO (Destination Information Object) message to cause communication units subordinate to the gateway to build a tree route and cause the communication units to maintain the tree route. The gateway advertisement is equivalent to the DIO message of Non Patent Literature 3. However, the gateway advertisement used in the communication system in this embodiment is not limited to the DIO message. It is specified that metric information, which is an index for route selection, is stored in the DIO message and the communication units perform the route selection on the basis of the metric information and an objective function. As explained above, in the present invention, the gateway information in the gateway advertisement includes the number of hops to the transmission source gateway and the number of communication units housed in the transmission source gateway (the number of housed communication unit). Information concerning the number of hops and the number of housed communication units is a gateway selection index for making it possible to autonomously determine a gateway in which a communication unit should participate.

The communication unit 3D, which receives the gateway advertisement transferred at step S6, executes processing at steps S7 to S10 same as the processing at steps S3 to S6 executed by the communication unit 3B.

Note that the communication unit, which receives the gateway advertisement, does not transfer the gateway advertisement downstream until the completion of the switching of the participation destination gateway (equivalent to steps S5 and S9) to prevent a situation in which a plurality of communication units simultaneously execute the switching of the participation destination gateway and, as a result, radio traffic is congested. When it is unlikely that traffic is not congested even if the gateway advertisement is immediately transferred, the execution order of the switching of the participation destination gateway and the transfer of the gateway advertisement can be opposite. The congestion of traffic can be prevented by performing the transfer of the gateway advertisement in the communication units earlier and adding a random delay at time when participation destination gateway switching processing is started.

The basic control operation on which the communication system according to the present invention is based is as explained above. In this basic control operation, the communication units, which receive the gateway information, individually perform on the basis of the information (information such as the number of hops to the transmission source gateway, the number of communication units housed in the transmission source gateway, and the communication quality to the transmission source gateway, etc.) whether the participation destination gateway is switched. Therefore, for example, when a distance between the gateways adjacent to each other is short, depending on a positional relation between the gateways, it is likely that the numbers of communication units participating in the gateways are not leveled. Therefore, in the communication system according to this embodiment, the numbers of communication units respectively housed in a plurality of gateways set in a narrow area are adjusted (mainly leveled) by adopting the aftermentioned control procedure.

<Configuration of the Communication Unit>

Figure 4:
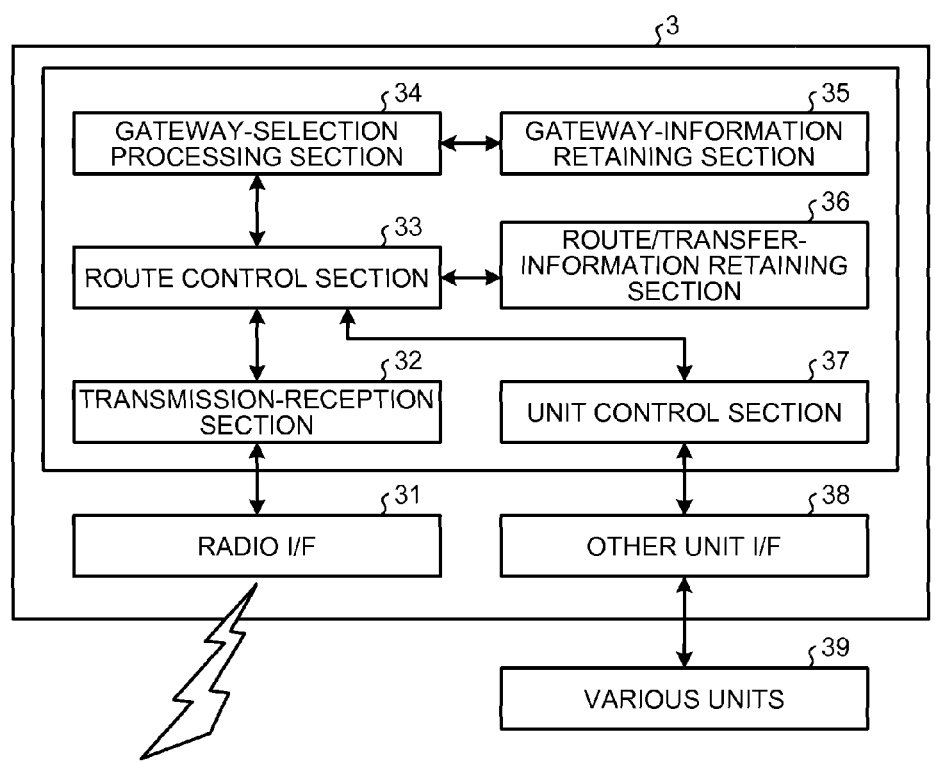
FIG. 4 is a diagram of an example of a functional block configuration of the communication unit.

FIG. 4 is a diagram of an example of a functional block configuration of the communication unit in the first embodiment. The communication unit 3 includes a radio interface (I/F) 31, a transmission-reception section 32, a route control section 33, a gateway-selection processing section 34, a gateway-information retaining section 35, a route/transfer-information retaining section 36, a unit control section 37, and an other unit interface (I/F) 38.

In the communication unit 3, the radio I/F 31 performs framing of communication data between other apparatuses (or the reverse). Note that a radio medium is assumed to be specified small power radio, a wireless LAN, a PHS, or the like.

The transmission-reception section 32 performs format analysis and frame generation of communication data transmitted and received to and from other apparatuses (the communication units, the gateways, the monitoring server, etc.) via the radio I/F 31 and performs data relay with a host control section not shown in the figure. The transmission-reception section 32 carefully examines framed data and performs a frame error check (performs retransmission control or the like in frame unit using additional data of a check sum, a cyclic redundancy check, and the like). When a frame is normally received, the transmission-reception section 32 outputs a reception frame to the route control section 33.

To build an ad hoc communication network, the route control section 33 performs communication with communication units around the communication unit 3 and performs exchange of information concerning route establishment such as apparatus identifiers of the other communication units around the communication unit 3 (hereafter referred to as adjacent communication units), a band in use (a channel), the number of hops to a gateway, and reception signal intensity (intensity of reception signals from the adjacent communication units). In addition, when the reception frame from the transmission-reception section 32 is input, the route control section 33 analyzes a header of the frame and determines whether the frame is addressed to the own apparatus. When the frame is addressed to the own apparatus, the route control section 33 relays the frame to the unit control section 37. When the frame is addressed to another apparatus rather than the own apparatus, the route control section 33 checks a route management table retained by the route/transfer-information retaining section 36, specifies the next relay apparatus (a communication unit or a gateway), and transfers the frame to the apparatus through the transmission-reception section 32 and the radio I/F 31.

The gateway-selection processing section 34 is a key component for realizing the communication system in this embodiment. As explained in detail below, the gateway-selection processing section 34 performs, on the basis of the gateway information included in the receive gateway advertisement, determination of necessity of gateway switching, selection of a gateway set as a participation destination, control of a participation operation in the gateway, and the like.

The gateway-information retaining section 35 stores the gateway information received from the gateway. FIG. 5 is a diagram of an example of information managed by the gateway-information retaining section 35 (a gateway information database). The gateway information database is a database form of the gateway information included in the gateway advertisement received from the gateway. As shown in the figure, the gateway information includes a gateway identifier (GWID), a radio channel number in use (radio CH), the number of hops to the gateway (number of hops), the number of communication units housed in the gateway (housed number), route quality to the gateway, and option information explained below. When the gateway-information retaining section 35 acquires the gateway information, the gateway-information retaining section 35 registers presence or absence of participation registration (participation state), last update time, and the gateway information in the database in association with one another. Note that, when the gateway information is received from the same gateway a plurality of times, the gateway-information retaining section 35 stores latest gateway information and discards old gateway information. Note that a gateway marked by a circle in the participation state is a participating gateway. When the gateway information database shown in FIG. 5 is updated, the gateway-selection processing section 34 checks the gateway information database after the update and performs reselection of a gateway set as a participation destination (determines necessity of gateway switching).

The route/transfer-information retaining section 36 stores the information exchanged with the adjacent communication units by the route control section 33 and the route management table.

The unit control section 37 performs control of the sections in the own communication unit according to a control telegraphic message (a control message) transmitted to the own communication unit from the job server or the monitoring server. The unit control section 37 performs response telegraphic message generation. The unit control section 37 performs, according to necessary, control of various units 39 connected through the other unit I/F 38.

The other unit I/F 38 is a physical interface for connecting the various units 39 on the outside and indicates a communication medium (either wired or wireless). The other unit I/F 38 can be configured to be capable of simultaneously connecting a plurality of external units.

The various units 39 are control target devices for acquiring sensor information (meter reading data) using an ad hoc communication network such as a metering unit that records meter reading values of gas, water service, electricity, and the like and an opening-closing unit that controls start and stop of service provision.

Note that, in FIG. 4, the communication unit is shown that includes the interface (the other unit I/F 38) for connecting apparatuses, which acquire meter reading data of gas, water service, electricity, and the like, and acquires the meter reading data using the external control target apparatuses. However, the communication unit can be configured to be capable of directly acquiring the meter reading data.

<Message Format of the Gateway Advertisement>

Figure 6:
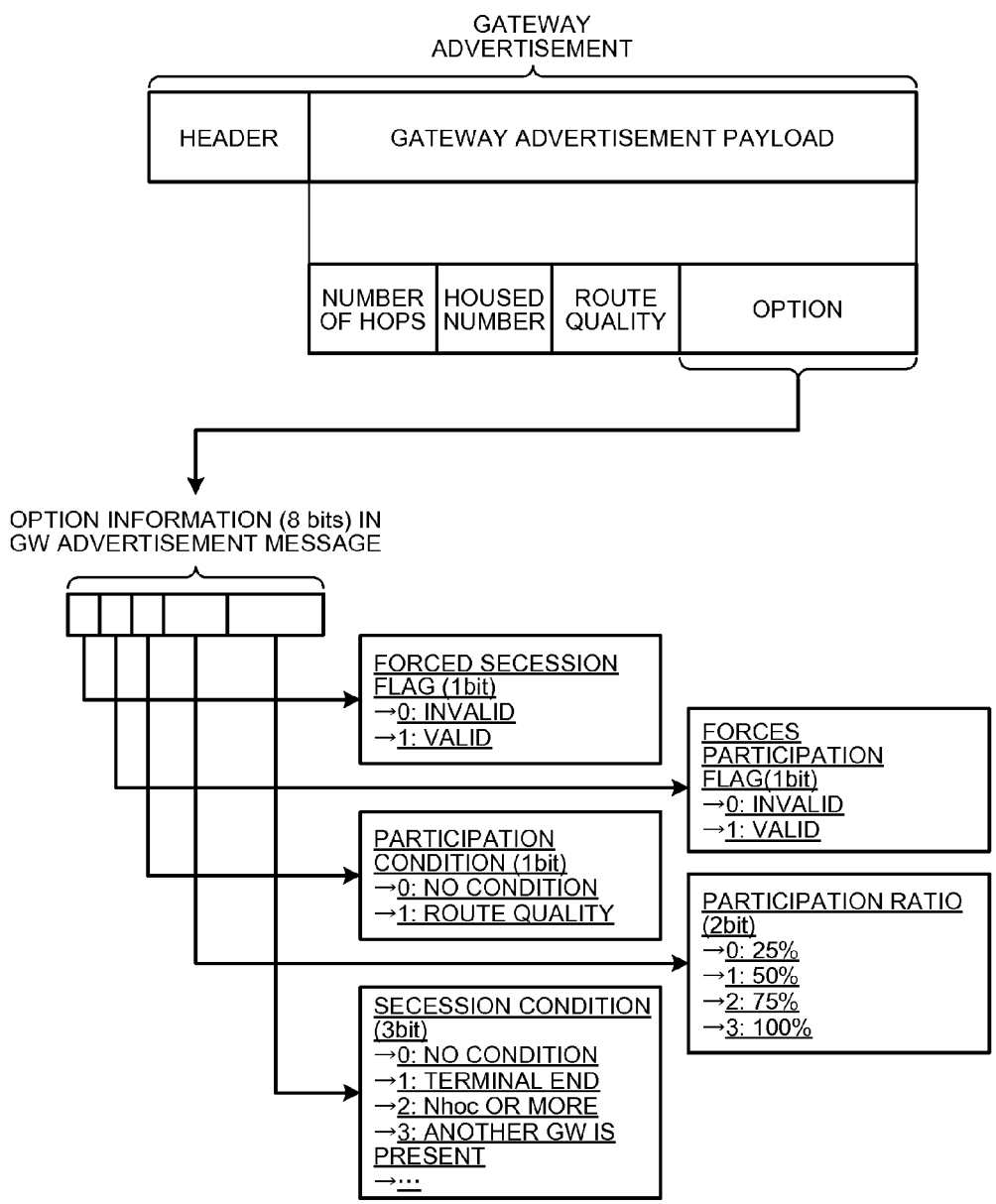
FIG. 6 is a diagram of an example of a message format of a gateway advertisement.

FIG. 6 is a diagram of an example of a message format of the gateway advertisement. As shown in the figure, the gateway advertisement is configured by a header and a gateway advertisement payload. The number of hops, the housing number, the route quality, and the option information are stored in the gateway advertisement payload.

The number of hops, the housed number, the route quality, and the option information configure the gateway information explained above (see FIG. 5).

The number of hops is incremented every time the gateway advertisement is transferred. Note that, when a number of hops field is present in the header section of the message format, the gateway advertisement payload does not include the number of hops.

The housed number indicates the number of communication units housed in a transmission source gateway at a point when the gateway advertisement is transmitted.

The route quality indicates communication quality information in a route to the transmission source gateway of the gateway advertisement. This information is updated by a communication unit that receives the gateway advertisement. The communication unit transfers the route quality after the update while placing the route quality on the gateway advertisement.

The option information is used to realize leveling of the numbers of communication units housed in the gateways in the communication system in this embodiment. The option information illustrated in FIG. 6 is formed in an 8-bit configuration and includes a forced secession flag (1 bit), a forced participation flag (1 bit), a participation condition (1 bit), a participation rate (2 bits), and a secession condition (3 bits). The forced secession flag is information for instructing, among communication units that receive the gateway advertisement, a communication unit participating in the own gateway (the transmission source gateway of the gateway advertisement) and satisfying the secession condition to secede from the own gateway. The forced participation flag is information for causing, among the communication units that receive the gateway advertisement, a communication unit not participating in the own gateway and satisfying the secession condition to execute reselection of a gateway set as a participation destination and urging the communication unit to participate in the own gateway. The participation condition and the participation rate are information referred to when the forced participation flag is set. The participation condition and the participation rate are used by the communication unit, which receives the gateway advertisement in which the forced participation flag is set, in determining whether the communication unit participates in the transmission source gateway of the gateway advertisement. The secession condition is information referred to when the forced secession flag is set. The session condition is used by the communication unit, which receives the gateway advertisement in which the forced secession flag is set, in determining whether the communication unit secedes from the transmission source gateway of the gateway advertisement.

Note that the forced recession flag and the forced participation flag are not simultaneously set.

<Operation of a Communication Unit Performed when the Communication Unit Receives the Gateway Advertisement Including the Option Information>

Figure 7:
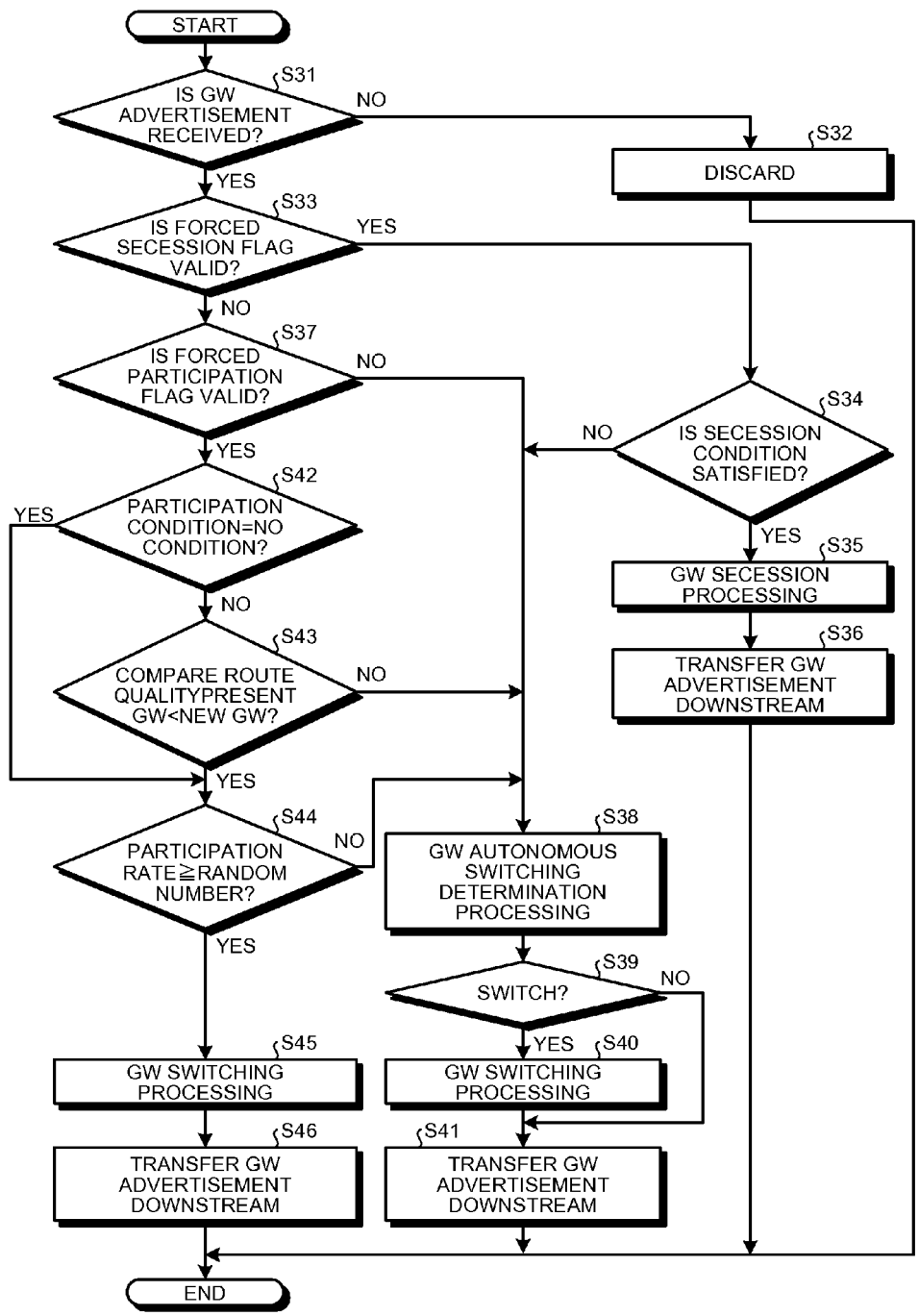
FIG. 7 is a flowchart for explaining an operation example of a communication unit that receives the gateway advertisement.

An operation of a communication unit performed when the communication unit receives the gateway advertisement (GW advertisement) including the option information, which is a characteristic operation in this embodiment, is explained with reference to FIG. 7. Note that FIG. 7 is a flowchart for explaining an operation example of the communication unit that receives the GW advertisement. The operation explained below is equivalent to a detailed operation of steps S4 and S8 shown in FIG. 3.

The communication unit monitors whether the GW advertisement is received. When the communication unit receives a normal and valid GW advertisement (Yes at step S31), first, the communication unit determines whether the forced secession flag is valid (step S33). At this point, the communication unit also checks whether the received GW advertisement is transmitted from a participating gateway. This is because, if the received GW advertisement is transmitted from a non-participating gateway, it is unnecessary to check the secession condition, which is information for instructing secession. Note that, when the communication unit receives an abnormal or invalid GW advertisement (No at step S31), the communication unit discards the received message and ends the processing (step S32). When the communication unit receives a GW advertisement transmitted by a communication unit present further downstream than the communication unit or when the communication unit receives a GW advertisement same as a GW advertisement received in the past, the communication unit treats the GW advertisement as an invalid GW advertisement. The communication unit determines according to a sequence number attached to the GW advertisement whether the GW advertisement is the same as the GW advertisement received in the past.

When a transmission source of the GW advertisement is the participating gateway and the forced secession flag is valid (Yes at step S33), the communication unit checks whether the secession condition is satisfied (step S34). As a result of the check, if the secession condition is satisfied (Yes at step S34), the communication unit executes processing for seceding from the participating gateway (release processing for the participation registration) (step S35). For example, when "no condition" is set in the secession condition, the communication unit always executes step S35. When "terminal end" is set in the secession condition, if another communication unit is absent downstream, the communication unit executes step S35. When "Nhop or more" is set in the secession condition, the communication unit executes step S35 if the number of hops to the participating gateway is N (an integer equal to or larger than 2). When "another GW is present" is set in the secession condition, the communication unit executes step S35 if another gateway in which the communication unit can participate is present. When the processing at step S35 ends, the communication unit broadcast-transfers the GW advertisement to a communication unit present downstream (step S36). Note that, as explained above, in transferring the GW advertisement, the communication unit updates the number of hops and the route quality. When another communication unit is absent downstream, the communication unit omits step S36. After seceding from the gateway, the communication unit performs selection processing for a gateway in which the communication unit participates again and participation processing for participating in a selected gateway. When the secession condition is not satisfied (No at step S34), the communication unit executes GW autonomous switching determination processing explained below and processing subsequent to the GW autonomous switching determination processing (step S38 to S41).

When the communication unit determines at step S33 that the received GW advertisement is not transmitted from the participating gateway or the forced secession flag is invalid (No at step S33), the communication unit checks whether the forced participation flag is valid (step S37). At this point, the communication unit also checks whether the received GW advertisement is transmitted from a gateway other than the participating gateway. This is because, if the received GW advertisement is transmitted from the participating gateway, it is unnecessary to check participation condition, which is information for instructing participation. When the received GW advertisement is transmitted from the participating gateway or the forced participation flag is invalid (No at step S37), the communication unit executes the GW autonomous switching determination processing explained below and the processing subsequent to the GW autonomous switching determination processing (step S38 to S41).

When the received GW advertisement is transmitted from a gateway other than the participating gateway and the forced participation flag is valid (Yes at step S37), the communication unit checks the participation condition (step S42). When "no condition" is not set as the participation condition (No at step S42), the communication unit further checks route quality to the participating gateway (the present GW) and route quality to a transmission source gateway of the received GW advertisement (a new GW) (step S43). When the route quality to the present GW is better than the route quality to the new GW (No at step S43), the communication unit executes the GW autonomous switching determination processing explained below and the processing subsequent to the GW autonomous switching determination processing (step S38 to S41).

When "no condition" is set as the participation condition (Yes at step S42) and when the communication unit determines at step S43 that the route quality to the present GW is better than the route quality to the new GW (Yes at step S43), the communication unit generates a random number according to a predetermined method and compares the generate random number and a participation rate set in the option information (see FIG. 6) (step S44). Not that a range of the random number to be generated is "0 to 99". As a result of the comparison, if "participation rate ≥ random number" holds (Yes at step S44), the communication unit executes gateway switching processing, that is, processing for seceding from the participating gateway (processing same as step S35) and processing for participating in the transmission source gateway of the GW advertisement (step S45). Further, the communication unit broadcast-transfers the GW advertisement to a communication unit present downstream (step S46). Step S46 is processing same as step S36 explained above. When another communication unit is absent downstream, the communication unit omits step S46. As a result of the comparison at step S44, if "participation rate ≥ random number" does not hold (No at step S44), the communication unit executes the GW autonomous switching determination processing explained below and the processing subsequent to the GW autonomous switching determination processing (step S38 to S41).

The GW autonomous switching determination processing at step S38 and the processing subsequent to the GW autonomous switching determination processing are explained. The GW autonomous switching determination processing is an operation same as the operation for determining necessity of gate switching when a general communication unit receives the GW advertisement. Specifically, the communication unit acquires information such as the number of hops, the housed number, and the route quality included in the GW advertisement and determines on the basis of these kinds of information whether gateway switching is necessary (step S38 and S39). That is, the communication unit performs reselection of a participation destination gateway. At this point, the communication unit uses an algorithm for preferentially selecting the participating gateway. As a result of the reselection, when the communication unit determines that the switching of the participation destination is necessary (Yes at step S39), the communication unit executes the gateway switching processing and processing for transferring the GW advertisement downstream (steps S40 and S41). When the communication unit determines that the switching of the participation destination is unnecessary (No at step S39), the communication unit immediately executes step S41. Note that the processing at step S40 is processing same as step S45 explained above. The processing at step S41 is processing same as steps S36 and S46 explained above.

<Problems of the Conventional Communication System and Effects Obtained by the Communication System in this Embodiment>

Problems of the conventional communication system and effects obtained by the communication system in this embodiment are explained below.

In the conventional control operation for using, as the gateway selection indexes, the number of hops (the number of hops to a gateway) and the housed number (the number of communication units housed in the gateway), there is a network environment in which load distribution is difficult. For example, in a network in which a participation destination is selected according to the number of hops to a gateway, when a plurality of gateways are set close to one another, in a preferential selection algorithm according to the number of hops (an algorithm for preferentially selecting the participating gateway), it is likely that an optimum gateway (a gateway having a low processing load) cannot be selected and communication units are concentratedly subordinate to one gateway. In a network in which a participation destination is selected according to the number of communication units housed in a gateway, it is necessary to set a gateway comparison threshold (a threshold of a difference in the numbers of communication units participating in gateways) for the purpose of preventing frequent occurrence of a participation destination change. That is, because the participation destination change is performed when the difference in the numbers of the communication units participating in the gateways exceeds the threshold, it is difficult to level the numbers of the communication units participating in the gateways. In addition, it is likely that an ad hoc communication network formed to be subordinate to each of a plurality of gateways is not made uniform in a peripheral area.

Figure 8:
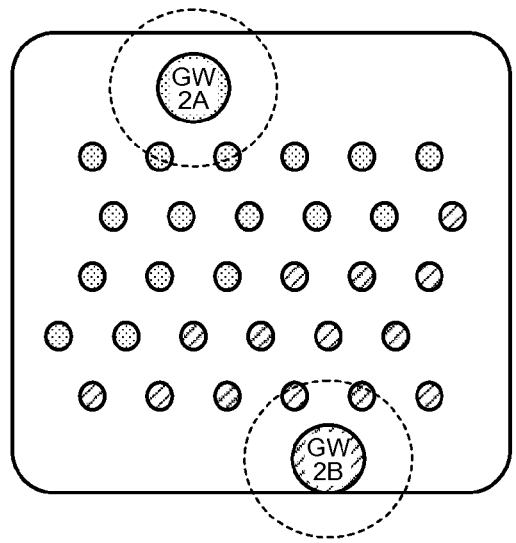
FIG. 8 is a diagram of an example of an operation for leveling the numbers of communication units participating in the gateways.
Figure 9:
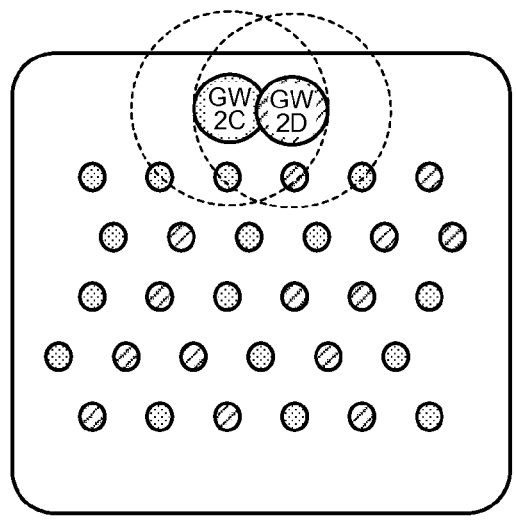
FIG. 9 is a diagram of an example of an operation for leveling the number of communication units participating in the gateways.

On the other hand, with the communication system according to this embodiment, it is possible to efficiently and surely perform load distribution between the gateways (leveling of the numbers of communication units participating in the gateways). As shown in FIG. 8 and FIG. 9, the gateway sets the forced participation flag in the option information in the GW advertisement and sets the participation rate corresponding to the positional relation between the gateways adjacent to each other and broadcast-delivers the participation rate, whereby it is possible to level the numbers of communication units participating in the gateways. When the adjacent gateways 2A and 2B are sufficiently separated from each other as shown in FIG. 8, it is possible to level the numbers of communication units participating in the gateways by setting the participation rate to 100%. On the other hand, when gateways 2C and 2D are close to each other as shown in FIG. 9, when the participation rate is set to 100%, it is likely that the communication units concentratedly participate in one gateway. Therefore, the GW advertisement in which the participation rate is set to 50% is broadcast-delivered from the gateways 2C and 2D. Consequently, it is possible to level the participation rate. Note that, in FIG. 8 and FIG. 9, wavy-line circles centering on the gateways indicate reaching ranges of radio waves transmitted by the gateways. The communication units located within the ranges can directly communicate with the gateways.

By designating the route quality as the participation condition in addition to the participation rate, while attaining load distribution between the gateways, it is possible to select a route such that the communication quality to a gateway satisfies required quality. Further, the monitoring server retains position information (latitudes and longitudes) of the gateways, grasps, on the basis of the position information, physical distances to the gateways and the numbers of gateways close to each other, and adjusts the participation rate in the GW advertisement according to the distances and the number of gateways, whereby it is possible to perform fine load distribution control. For example, when two gateways are set close to each other, the monitoring server instructs the two gateways to broadcast-deliver the GW advertisement in which the participation rate is set to 50% (equivalent to FIG. 9). When four gateways are set close to one another, the monitoring server instructs the four gateways to broadcast-deliver the GW advertisement in which the participation rate is set to 25%.

Figure 10:
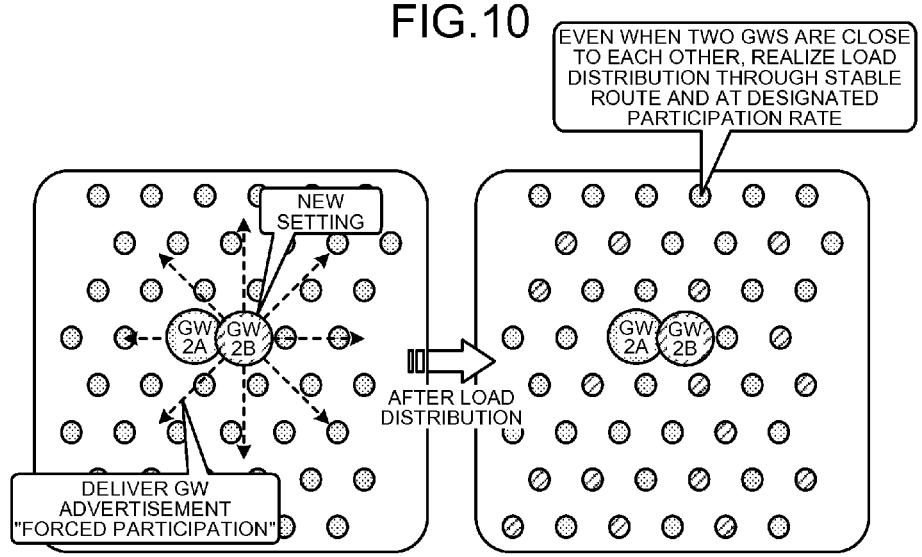
FIG. 10 is a diagram of an example of an operation for distributing loads using a GW advertisement in which a forced participation flag is set.

FIG. 10 is a diagram of an example of an operation for distributing loads using the GW advertisement in which the forced participation flag is set. In the initial state, the gateway 2A normally operates and all the communication units around the gateway 2A are housed in the gateway 2A. In this state, a new gateway 2B is set near the gateway 2A. At this point, to distribute participation destinations of the peripheral communication units to the gateways 2A and 2B, the GW advertisement in which the forced participation flag is set to "valid", the participation condition is set to "route quality", and the participation rate is set to "50%" is broadcast-delivered from the gateway 2B. As a result, the communication units satisfying the forced participation condition sequentially participate and are registered in the gateway 2B. An ad hoc communication network is formed in which the numbers of communication units participating in the gateways are distributed. Note that the GW advertisement can be transmitted a plurality of times according to the number of communication units participating in the gateway 2B.

Figure 11:
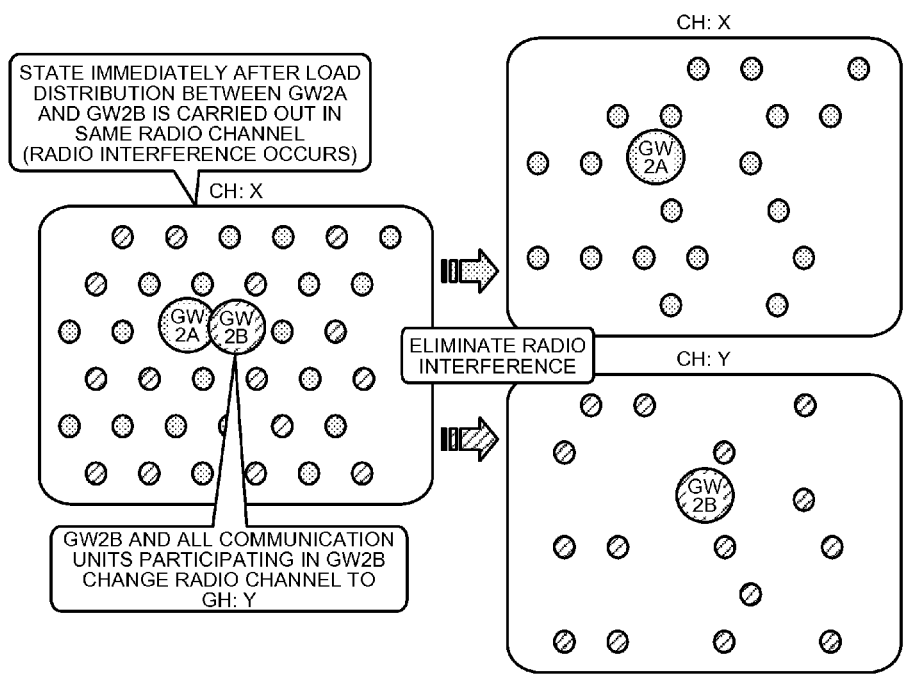
FIG. 11 is a diagram of an example of an operation for eliminating radio interference.

According to the operation explained above, it is possible to realize leveling of the numbers of communication units participating in a plurality of gateways. However, in an environment in which gateways and communication units are extremely densely set, even if loads of participating and registered communication units are distribute by the gateways, if the same radio channel is used, deterioration in communication performance due to radio interference is inevitable. A method of solving this problem is explained with reference to FIG. 11. In the initial state, the load distribution according to the procedure shown in FIG. 10 is already carried out. Radio channels used by the gateways 2A and 2B and the communication units are a channel X. Deterioration in communication performance due to radio interference occurs. In this case, the monitoring server changes the radio channel used by one gateway (in FIG. 11, the gateway 2B) and all the communication unit subordinate to the gateway to a channel Y. That is, when the monitoring server detects that a certain gateway is in an overload state and radio interference occurs in the communication units subordinate to the gateway, the monitoring server carries out load distribution control and carries out control for changing the radio channel. Consequently, it is possible to quickly eliminate the radio interference while maintaining a communication route to the communication units.

Note that the change of the radio channel is performed by, for example, causing the gateway 2B to broadcast-deliver a radio channel change notification message to the communication units subordinate to the gateway 2B. The radio channel change notification message includes information concerning the radio channel after the change. The communication units, which receive the radio channel change notification message, broadcast-transfer the radio channel change notification message according to necessity and, thereafter, switch the radio channel in use. The gateway 2B can include, in the radio channel change notification message, information concerning timing (time) for switching the radio channel and control the gateway 2B itself and the communication units subordinate to the gateway 2B to simultaneously switch the radio channels.

As explained above, in the communication system in this embodiment, the gateway set anew or the gateway restored from a failure distributes, to the communication units already participating in another gateway, the GW advertisement in which the option information (the forced participation flag, the participation condition, and the participation rate) for urging the communication units to move to be subordinate to the own gateway. The communication units, which receive the GW advertisement, determine whether a participation destination is changed according to the algorithm in which the option information is used (reselects the gateway at the participation destination). Consequently, even in a special environment in which it is likely that a gateway selected as the participation destination of the communication units is biased if the participation destination is selected by the conventional method, for example, when a plurality of gateways are close to one another, it is possible to surely level the numbers of communication units participating in the gateways. Further, because the control signal is delivered by broadcast, it is possible to carry out the load distribution control without affecting the job communication.

In the explanation in this embodiment, it is assumed that a gateway is set anew or a gateway is restored from a failure. However, when the numbers of communication units participating in gateways are not leveled because of some cause between the normally-operating gateways adjacent to each other, it is possible to deliver the GW advertisement, in which the option information is set, to level the numbers of communication units participating in the gateways. For example, it is also possible that the GW advertisement not including the option information is delivered from the gateways at normal time, the communication units are controlled to determine a participation destination according to the conventional method, and, when the monitoring server detects a gateway in the overload state, occurrence of congestion of radio traffic, and occurrence of radio interference, the monitoring server instructs a gateway in which the problem such as the overload occurs or a gateway around the gateway to deliver the GW advertisement in which the option information is set.

In the above explanation, the numbers of communication units participating respectively participating in a plurality of gateways are controlled to be leveled. However, the monitoring server can flexibly adjust the numbers of communication units participating in the gateways by adjusting the setting of the participation rate. For example, the numbers of communication units respectively participating in two gateways can be controlled to be 1:2. Therefore, when the numbers of communication units capable of being housed in the gateways are different, for example, when gateways having different levels of performance are mixed, it is possible to perform flexible control to, for example, set a participation rate corresponding to the performance levels of the gateways (the numbers of communication units capable of being housed in the gateways).

When first communication units capable of performing an operation conforming to the option information (communication units capable of performing an operation in the procedure shown in FIG. 7) and second communication units incapable of performing the operation conforming to the option information (the conventional communication units) are mixed, it is also possible to adjust the numbers of communication units participating in the gateways and attain load distribution by setting the participation rate while taking into account a ratio of the first communication units and the second communication units.

Second Embodiments

In the first embodiment, as the load distribution control, the gateway having a small load (a small number of communication units participating therein) realizes the leveling of loads by causing the communication units housed in the gateway in the overload state to participate in the own gateway. On the other hand, in this embodiment, the gateway in the overload state realizes distribution of loads by urging communication units participating in the own gateway to change a participation destination to another gateway.

Figure 12:
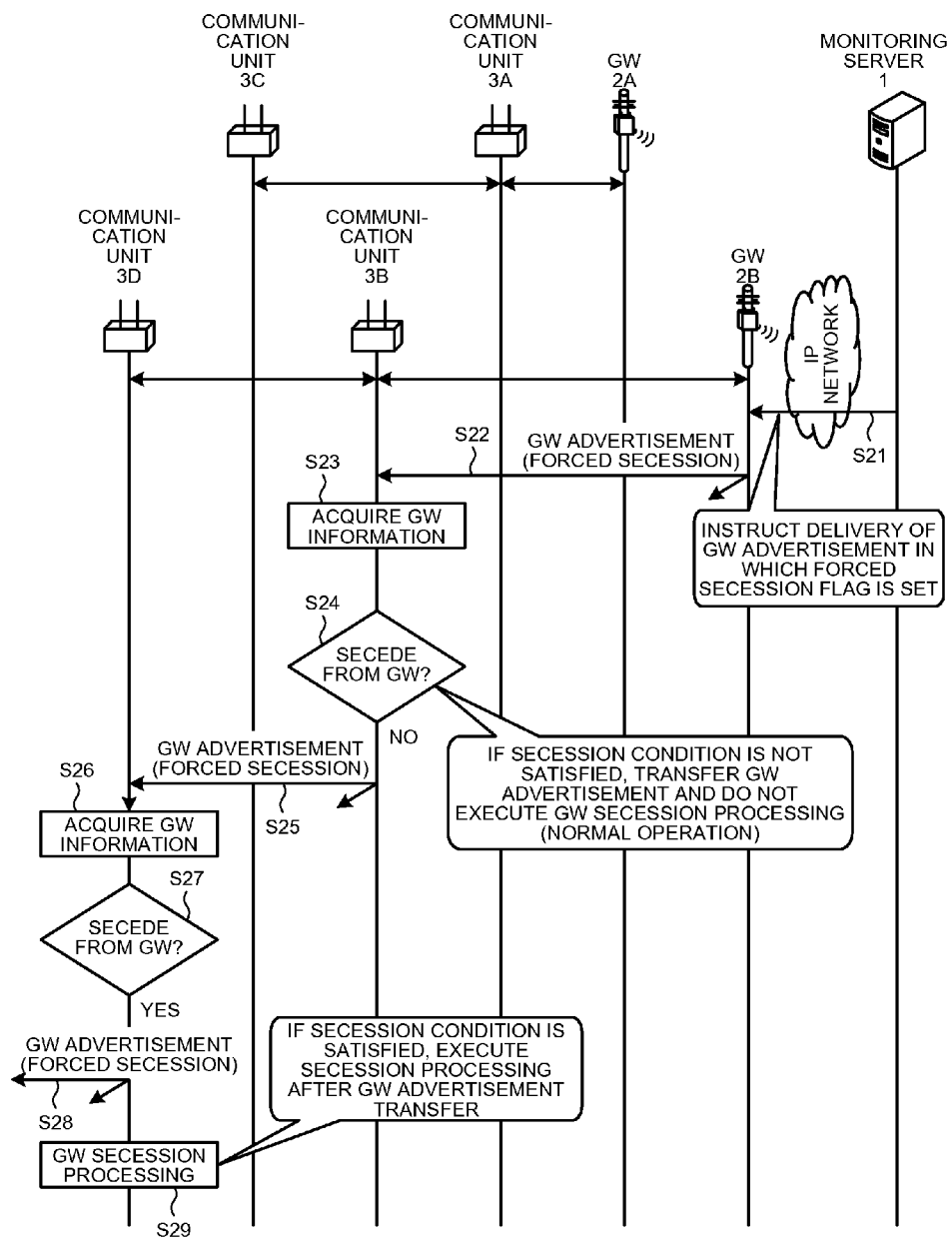
FIG. 12 is a diagram of an operation example of a communication system in a second embodiment.

FIG. 12 is a diagram of an operation example of a communication system in the second embodiment in the second embodiment. FIG. 12 is shows an operation example in a state in which the communication units 3A and 3C are participating in the gateway 2A and the communication units 3B and 3D are participating in the gateway 2B. The gateways 2A and 2B are connected to the monitoring server 1 via an IP network or the like. Note that the configuration of the communication system is not limited to this. The number of gateways and the number of communication units and a connection relation between the gateways and the communication units can be different from the numbers and the connection relation shown in FIG. 12.

In the communication system having the configuration explained above, a control operation performed when the gateway 2B is in an overload state and, on the other hand, the gateway 2A is not in the overload state is explained below.

The monitoring server 1 monitors states of the gateways, which are connected to the monitoring server 1, and communication units subordinate to the monitoring server 1. For example, when the monitoring server 1 detects that the gateway 2B is in the overload state, the monitoring server 1 instructs the gateway 2B to deliver a GW advertisement in which the forced secession flag (see FIG. 6) is set (step S21). To instruct communication units participating in the own gateway to secede (reselect a participation destination), the gateway 2B, which receives the instruction, broadcast-delivers the GW advertisement in which the forced secession flag is set (step S22). A communication unit (in the example shown in FIG. 12, the communication unit 3B), which receives the GW advertisement in which the forced secession flag is set, acquires gateway information (gateway information of the gateway 2B) included in the GW advertisement (step S23). After updating the gateway information database (see FIG. 5), the communication unit 3B determines whether the communication unit 3B secedes from the gateway 2B in which the communication unit 3B participates (step S24). The communication unit 3B determines referring to a secession condition set in the GW advertisement whether the communication unit 3B secedes from the gateway 2B.

The secession condition is explained. As shown in FIG. 6, in the "secession condition", for example, "no condition", "terminal end", "Nhop or more", "another GW is present", and the like are set by a transmission source gateway of the GW advertisement. The monitoring server 1 or the transmission source gateway determines which of the conditions is set. When a communication unit receives the GW advertisement of "secession condition=no condition", the communication unit always executes reselection of a participation destination. When the communication unit receives the GW advertisement of "secession condition=terminal end", if the communication unit is at the terminal end (i.e., another communication unit is absent downstream), the communication unit executes the reselection of the participation destination. To enable the communication unit to discriminate whether the communication unit is the terminal end, for example, the route control section 33 only has to be configured to always retain all routes of downstream communication units. When it is difficult to retain all the routes, if a signal is not transmitted to the communication unit from the downstream communication units for a fixed period, the communication unit only has to determine that the communication unit is the terminal end and memorize that the communication unit is the communication unit at the terminal end. When the communication unit receives the GW advertisement of "secession condition=Nhop or more", the communication unit executes the reselection of the participation destination if the number of hops to a participating gateway is equal to or larger than N. When the communication unit receives the GW advertisement of "secession condition=another GW is present", the communication unit executes the reselection of the participation destination if another gateway in which the communication unit can participate is present other than the participating gateway.

By delivering the GW advertisement in which such a secession condition is set, it is possible to urge only a specific communication unit to change the participation destination. Note that the secession condition can be conditions other than the conditions shown in FIG. 6.

In this embodiment, the operation explanation is continued assuming that the communication unit 3B does not satisfy the secession condition, that is, the communication unit 3B determines that the communication unit 3B does not secede from the gateway 2B. When the communication unit 3B determines that the communication unit 3B does not secede from the gateway 2B (No at step S24), the communication unit 3B broadcast-transfers the GW advertisement to a communication unit present downstream (step S25). In transferring the GW advertisement, the communication unit 3B updates the number of hops and route quality in GW information.

The GW advertisement transferred by the communication unit 3B reaches the communication unit 3D. Like the communication unit 3B, the communication unit 3D acquires the gateway information included in the GW advertisement (step S26). After updating the gateway information database, the communication unit 3D determines whether the communication unit 3D secedes from the gateway 2B (step S27). When the communication unit 3D determines that the communication unit 3D secedes from the gateway 2B. (Yes at step S27), the communication unit 3D executes processing for broadcast-transfer the GW advertisement to a communication unit present downstream and processing for seceding from the gateway 2B in which the communication unit 3D participates (steps S28 and S29). Note that, when the communication unit 3B satisfies the secession condition at step S24, the communication unit 3B executes processing (secession processing) same as step S28 and, then, executes step S25 explained above. When the communication unit 3B determines at step S27 that the communication unit 3D does not secede from the gateway 2B, the communication unit 3D does not execute step S29. Although not shown in the figure, after executing step S29 and seceding from the gateway 2B, the communication unit 3D executes a participation operation in a gateway (the communication unit 3D can select the gateway 2B as the participation destination and participate in the gateway 2B again).

By performing such control, it is possible to move a specific communication unit subordinate to a gateway to be subordinate to another gateway and distribute loads.

Note that the secession instruction using the forced secession flag and the secession condition can be used for an execution timing instruction for a gateway search in a radio channel including a different radio channel. Unconditional periodical execution of the gateway search in another radio channel different from a radio channel in use leads to an increase in radio traffic and leads to an increase in a communication error occurrence rate involved in the search in the other radio channel. However, the monitoring server 1 monitors a traffic amount of the job communication or the like, performs the forced secession instruction by the gateway advertisement targeting a specific communication unit at timing when the job communication is not hindered, and executes the gateway search targeting radio channels other than the radio channel in use. Consequently, it is possible to suppress the increase in the communication error occurrence rate.

As explained above, in the communication system in this embodiment, the gateway in the overload state delivers, to the communication unit participating in the gateway, the GW advertisement in which the option information (the forced secession flag and the secession condition) for urging the communication unit to move to be subordinate to another gateway is set. The communication unit, which receives the GW advertisement, determines whether the communication unit changes the participation destination according to the algorithm in which the option information is used (reselects a gateway at the participation destination). Consequently, it is possible to distribute loads between the gateway in the overload state and the gateway adjacent to the gateway.

Note that, in this embodiment, the control for delivering the GW advertisement in which the forced secession flag and the secession condition are set to thereby urge a communication unit participating in a gateway to re-participate in another gateway (change a participation destination) is explained. However, this control and the control explained in the first embodiment (the control for delivering the GW advertisement in which the forced participation flag or the like is set) can be combined. For example, when the first gateway in the overload state and the second gateway not in the overload state are close to each other, the monitoring server 1 can instruct the first gateway to deliver the GW advertisement in which the forced secession flag is set and instruct the second gateway to deliver the GW advertisement in which the forced participation flag is set. In this case, compared with the application of only the control in the first embodiment or the application of only the control in this embodiment, it is possible to more surely and flexibly distribute loads of the gateways.

INDUSTRIAL APPLICABILITY

As explained above, the communication system according to the present invention is useful for an automatic metering system applied with ad hoc communication.

REFERENCE SIGNS LIST

1 Monitoring server
2, 2A, 2B Gateways
3, 3A, 3B, 3C, 3D Communication units
31 Radio I/F
32 Transmission-reception section
33 Route control section
34 Gateway-selection processing section
35 Gateway-information retaining section
36 Route/transfer-information retaining section
37 Unit control section
38 Other unit I/F
39 Various units

The invention claimed is:

1. A communication system comprising:
a plurality of ad hoc communication networks formed by one or more communication units and one gateway; and
a monitoring server that monitors the ad hoc communication networks, wherein
the monitoring server determines, on the basis of a monitoring result of load states of the gateways and a monitoring result of a congestion state of radio traffic, whether it is necessary to carry out load distribution control for moving a communication unit subordinate to a predetermined first gateway to be subordinate to a second gateway set around the first gateway and, when determining that it is necessary to carry out the load distribution control, instructs at least one gateway of the first gateway and the second gateway to broadcast-deliver a signal including control information that indicates a condition of a communication unit set as a movement target and instructing reselection of a gateway set as a participation destination,
wherein the control information delivered from the second gateway includes a condition of a communication unit caused to participate in the second gateway, and
when a communication unit participating in the first gateway receives the control information delivered from the second gateway, the communication unit determines whether the communication unit satisfies the condition and, when satisfying the condition, determines whether the communication unit switches the participation destination to the second gateway according to a predetermined algorithm.

2. The communication system according to claim 1, wherein
the condition is required communication quality in a communication route between a communication unit participating in the second gateway and the second gateway, and
when communication quality in the communication route between the communication unit participating in the second gateway and the second gateway can attain the required communication quality, the communication unit participating in the first gateway executes processing for determining whether the communication unit switches the participation destination to the second gateway.

3. The communication system according to claim 1, wherein
the control information further includes a participation rate that indicates a probability that the second gateway is selected as the participation destination again, and
when the communication unit participating in the first gateway receives the control information delivered from the second gateway, the communication unit determines whether the communication unit satisfies the condition, when satisfying the condition, compares a random number generated by a predetermined method and the participation rate, and, when "participation rate ≥ random number" holds, switches the participation destination to the second gateway.

4. The communication system according to claim 3, wherein the participation rate is determined on the basis of the number of the second gateways.

5. The communication system according to claim 1, wherein, when the monitoring server detects that the first gateway is in an overload state and radio traffic is congested in an ad hoc communication network formed by the first gateway, the monitoring server instructs at least one gateway of the first gateway and the second gateway to broadcast-deliver the signal and, when reselection of the participation destination by a communication unit that receives the signal ends, further instructs the second gateway and a communication unit subordinate to the second gateway to change a radio channel in use.

6. The communication system according to claim 1, wherein the control information delivered from the first gateway includes a condition of a communication unit caused to reselect the participation destination, and
when a communication unit participating in the first gateway receives the control information delivered from the first gateway, the communication unit determines whether the communication unit satisfies the condition and, when satisfying the condition, reselects the gateway set as the participation destination.

7. An automatic metering system comprising:
the communication system according to claim 1; and
a job server that collects meter reading data of electricity, gas, or water service of a consumer through the communication unit.

8. A communication monitoring server in a communication system:
the communication system comprising a plurality of ad hoc communication networks each formed by one or more communication units and one gateway; and
the monitoring server monitoring each of the ad hoc communication networks,
wherein the monitoring server determines, on the basis of a monitoring result of load states of the gateways and a monitoring result of a congestion state of radio traffic, whether it is necessary to carry out load distribution control for moving a communication unit subordinate to a predetermined first gateway to be subordinate to a second gateway set around the first gateway and, when determining that it is necessary to carry out the load distribution control, instructs at least one gateway of the first gateway and the second gateway to broadcast-deliver a signal including control information that indicates a condition of a communication unit set as a movement target and instructing reselection of a gateway set as a participation destination, wherein the control information delivered from the second gateway includes a condition of a communication unit caused to participate in the second gateway, and when a communication unit participating in the first gateway receives the control information delivered from the second gateway, the communication unit determines whether the communication unit satisfies the condition and, when satisfying the condition, determines whether the communication unit switches the participation destination to the second gateway according to a predetermined algorithm.

9. A gateway in a communication system:

the communication system comprising a plurality of ad hoc communication networks each formed by one or more communication units and one gateway; and a monitoring server that monitors each of the ad hoc communication networks, wherein when a predetermined condition is satisfied, the gateway broadcast-delivers a signal including control information that indicates a condition of a communication unit caused to be participated to itself and instructing reselection of the gateway set as a participation destination, wherein the control information includes a condition of a communication unit caused to participate, and when a communication unit participating receives the control information, the communication unit determines whether the communication unit satisfies the condition and, when satisfying the condition, determines whether the communication unit switches the participation destination according to a predetermined algorithm.

10. A communication unit in a communication system:

the communication system comprising a plurality of ad hoc communication networks each formed by one or more communication units and one gateway; and a monitoring server monitoring each of the ad hoc communication networks, wherein when the communication unit participating in a first gateway receives control information delivered from a second gateway different from the first gateway, and the control information includes a condition of a communication unit caused to participate in the second gateway, the communication unit determines whether the communication unit satisfies the condition and, when satisfying the condition, determines whether the communication unit switches the participation destination to the second gateway according to a predetermined algorithm.

* * * * *